United States Patent
Voigt et al.

(10) Patent No.: US 10,208,973 B2
(45) Date of Patent: Feb. 19, 2019

(54) SYSTEM AND METHOD FOR RAPID INPUT AND CONFIGURATION OF SENSORS FOR A HVAC MONITORING SYSTEM

(71) Applicant: Liebert Corporation, Columbus, OH (US)

(72) Inventors: Tyler Voigt, Delaware, OH (US); Michael Jason Gloeckner, Galena, OH (US)

(73) Assignee: Vertiv Corporation, Columbus, OH (US)

( * ) Notice: Subject to any disclaimer, the term of this patent is extended or adjusted under 35 U.S.C. 154(b) by 31 days.

(21) Appl. No.: 15/110,023

(22) PCT Filed: Dec. 18, 2015

(86) PCT No.: PCT/US2015/066800
§ 371 (c)(1),
(2) Date: Jul. 6, 2016

(87) PCT Pub. No.: WO2017/105503
PCT Pub. Date: Jun. 22, 2017

(65) Prior Publication Data
US 2017/0198935 A1  Jul. 13, 2017

(51) Int. Cl.
F24F 11/00  (2018.01)
F24F 11/30  (2018.01)
(Continued)

(52) U.S. Cl.
CPC .............. *F24F 11/30* (2018.01); *F24F 11/62* (2018.01); *G05B 19/048* (2013.01);
(Continued)

(58) Field of Classification Search
None
See application file for complete search history.

(56) References Cited

U.S. PATENT DOCUMENTS

| | | | |
|---|---|---|---|
| 6,622,925 B2 | 9/2003 | Carner et al. |
| 7,315,768 B2 | 1/2008 | Dang et al. |
| 7,937,167 B1 | 5/2011 | Mesarina et al. |
| 8,331,237 B2 | 12/2012 | Umeda |
| 8,854,822 B2 | 10/2014 | Hazzard et al. |
| 8,917,512 B2 | 12/2014 | Lozon et al. |

(Continued)

FOREIGN PATENT DOCUMENTS

SG    188751 A1    4/2013

OTHER PUBLICATIONS

International Search Report regarding PCT/US2015/066800, dated Jun. 2, 2016.
Written Opinion regarding PCT/US2015/066800, dated Jun. 2, 2016.

*Primary Examiner* — Paul B Yanchus, III

(57) ABSTRACT

The present disclosure relates to a processor based system for using temperature information being reported by a plurality of sensors present within a predetermined environment and controlling how various ones of the sensors are grouped together into a plurality of groups for monitoring purposes. The system includes a software subsystem that generates an association matrix screen on a display system associated with a computer system being used by a user with receives the temperature information. The association matrix screen enables a user to associate or disassociate specific sensors with selected groups of sensors using selection commands, as well as to provide temperature related information concerning all of the sensors being monitored by the system. Each of the sensors is not limited to being assigned to only a single group of sensors but may instead be assigned to two or more different groups of sensors for purposes of monitoring and/or control.

18 Claims, 17 Drawing Sheets

(51) Int. Cl.
*G05B 23/02* (2006.01)
*F24F 11/62* (2018.01)
*G05B 19/048* (2006.01)
*G06F 3/0482* (2013.01)
*F24F 11/63* (2018.01)
*F24F 110/10* (2018.01)
*F24F 11/52* (2018.01)
*G06F 3/0488* (2013.01)

(52) U.S. Cl.
CPC ....... *G05B 23/0272* (2013.01); *G06F 3/0482* (2013.01); *F24F 11/52* (2018.01); *F24F 11/63* (2018.01); *F24F 2110/10* (2018.01); *G05B 2219/2614* (2013.01); *G06F 3/0488* (2013.01)

(56) References Cited

U.S. PATENT DOCUMENTS

| | | | |
|---|---|---|---|
| 8,917,513 | B1 | 12/2014 | Hazzard |
| 9,046,897 | B2 | 6/2015 | Klinger |
| 2008/0084002 | A1* | 4/2008 | Raben ................. B29C 35/0288 264/40.1 |
| 2009/0204368 | A1 | 8/2009 | Bickel |
| 2010/0125437 | A1 | 5/2010 | Vasseur et al. |
| 2012/0259436 | A1* | 10/2012 | Resurreccion ..... G05B 23/0216 700/17 |
| 2014/0257752 | A1 | 9/2014 | Mast et al. |
| 2015/0026622 | A1* | 1/2015 | Roaldson ............... G06F 3/0484 715/771 |
| 2015/0102101 | A1 | 4/2015 | Hazzard |

\* cited by examiner

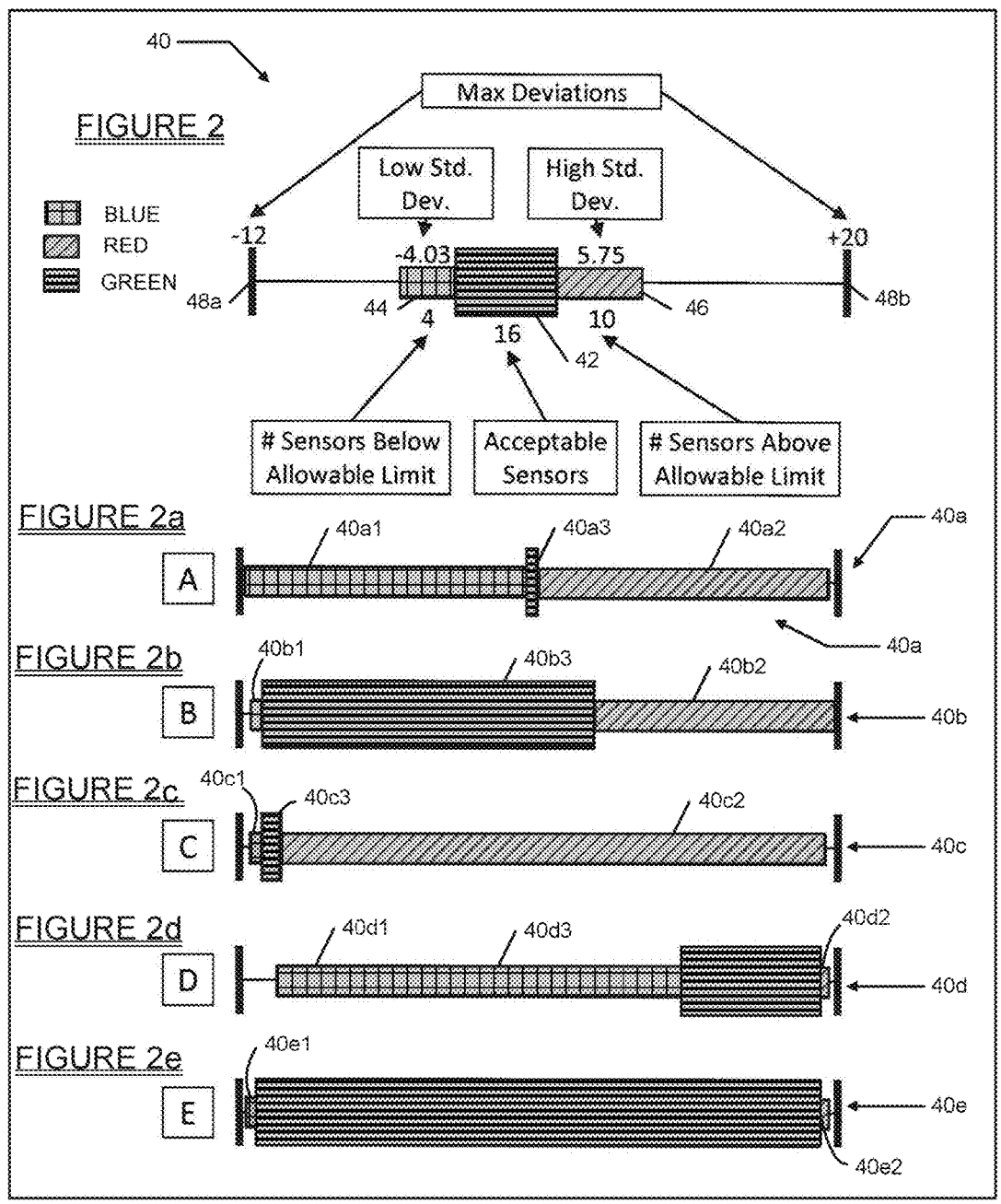

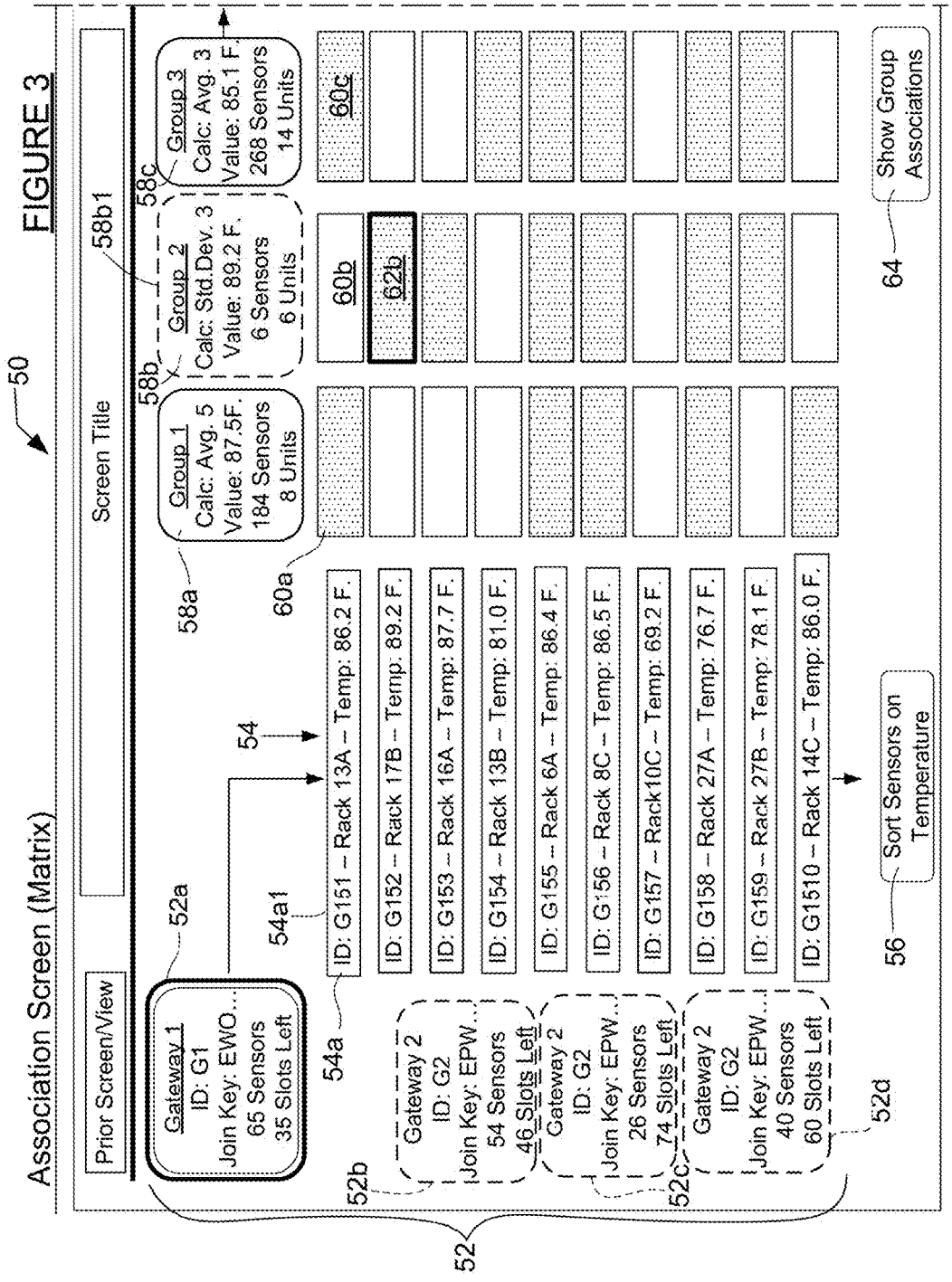

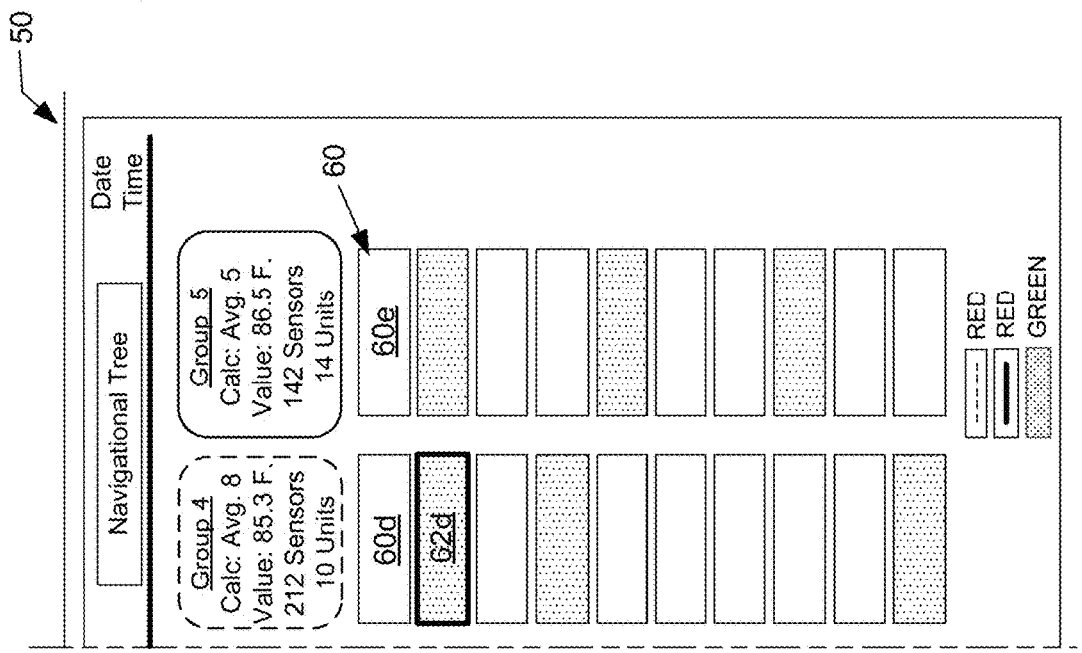

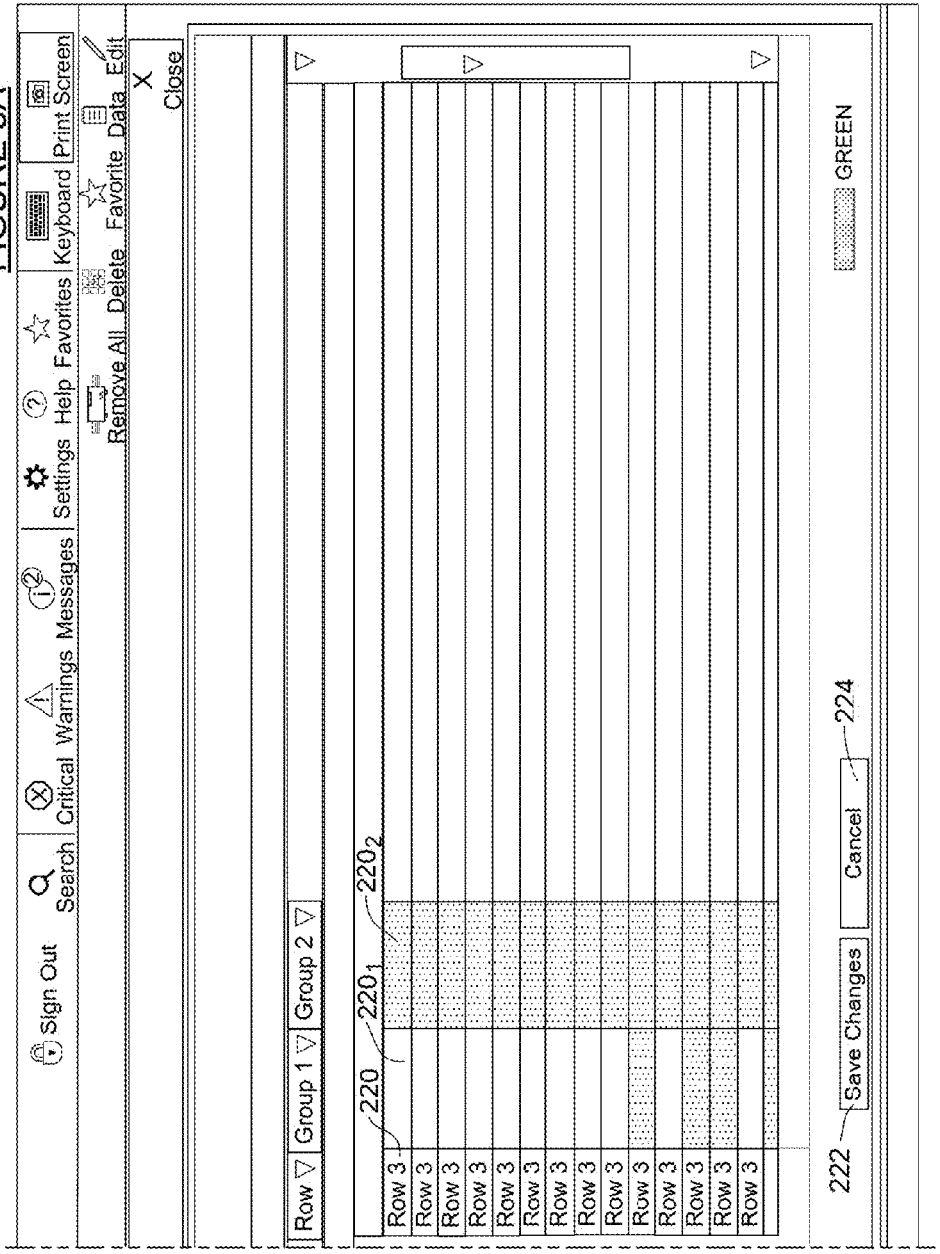

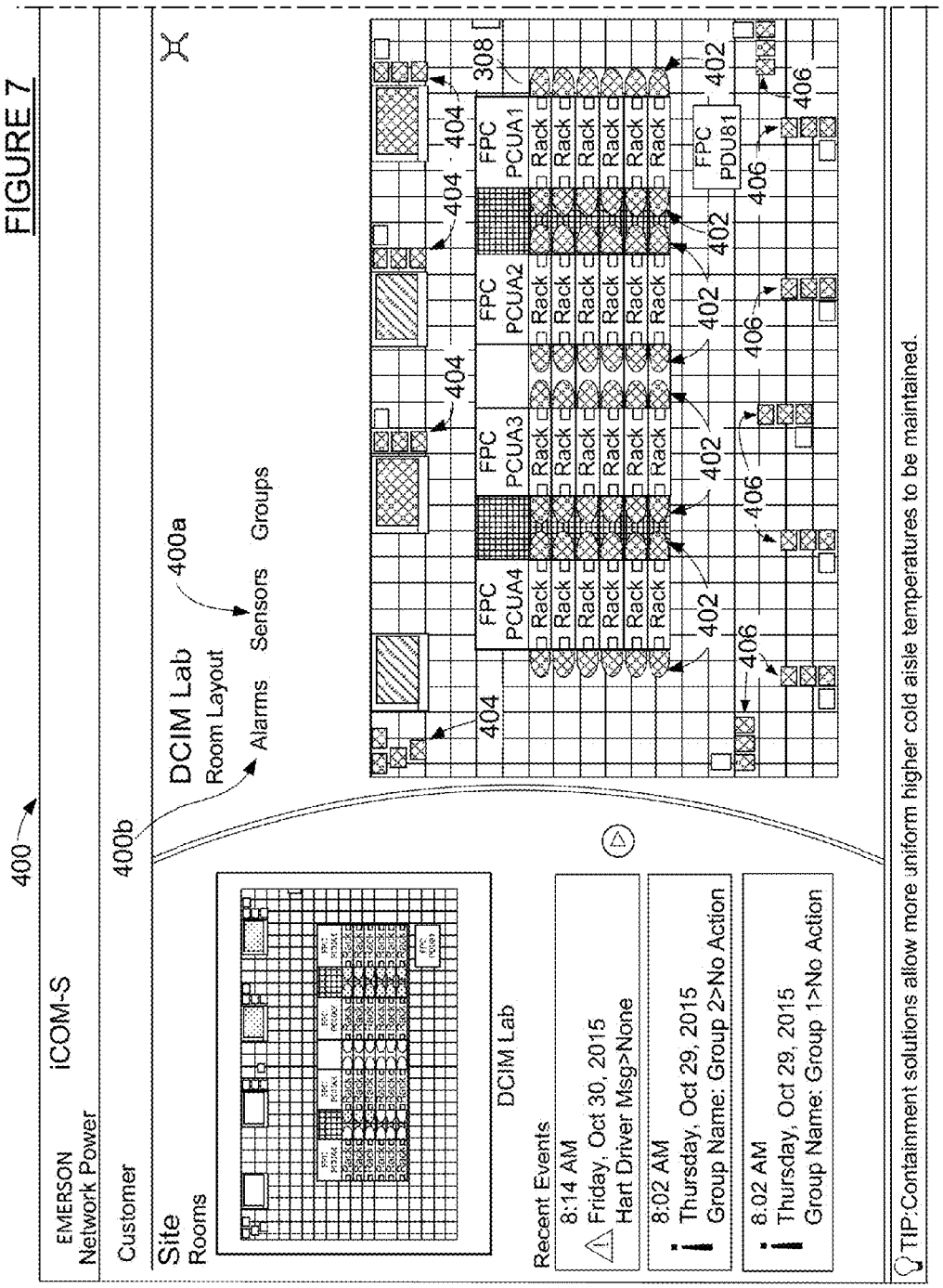

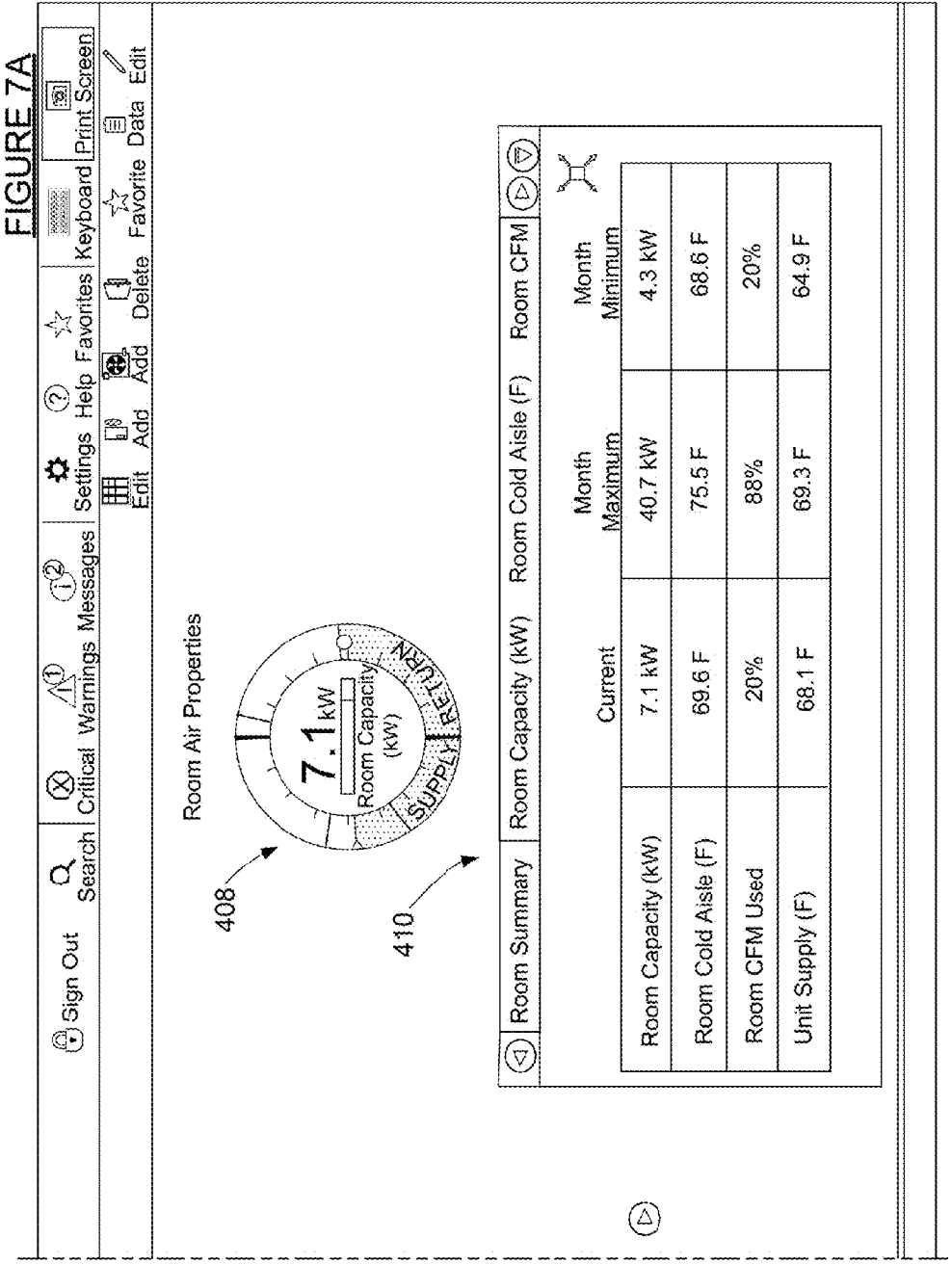

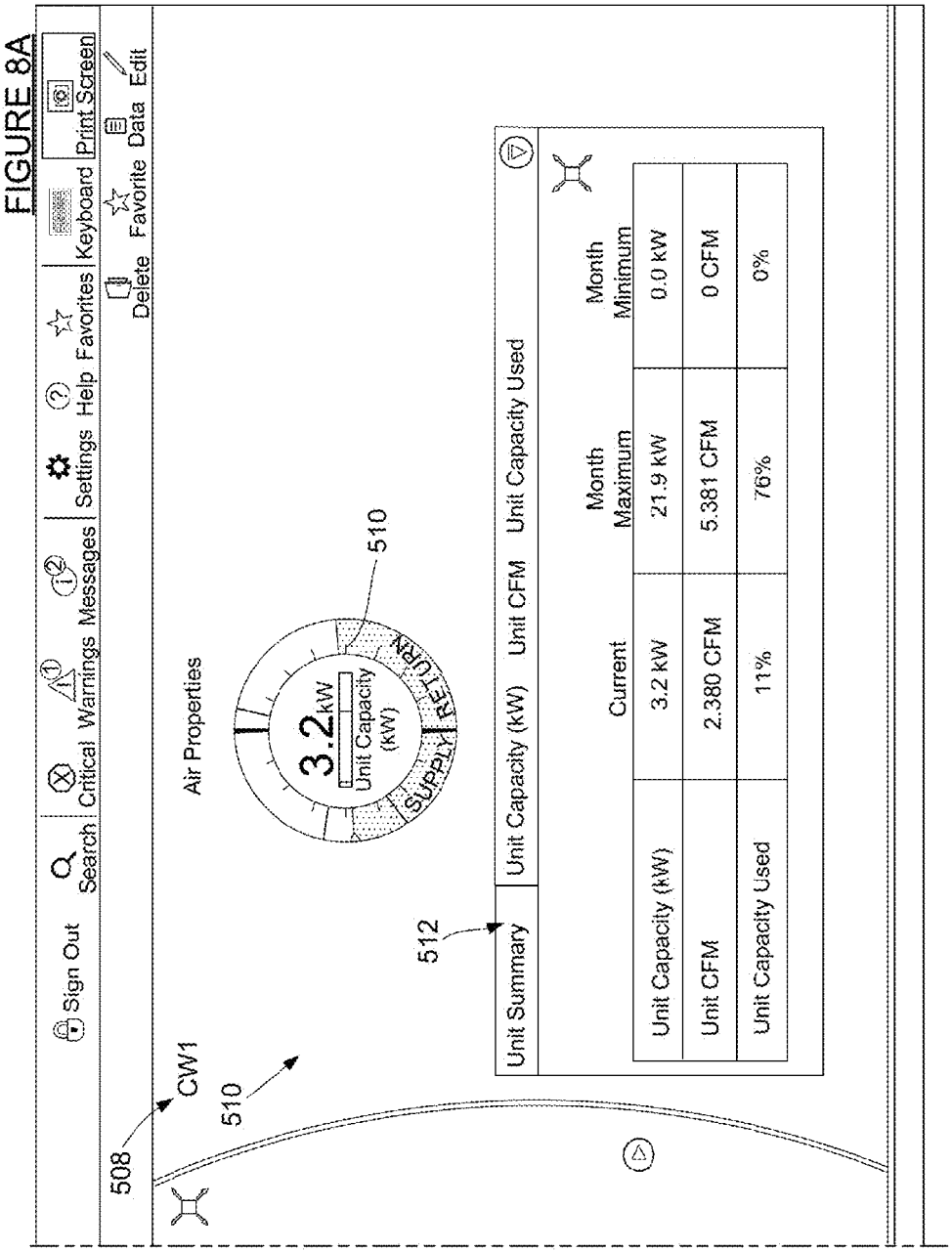

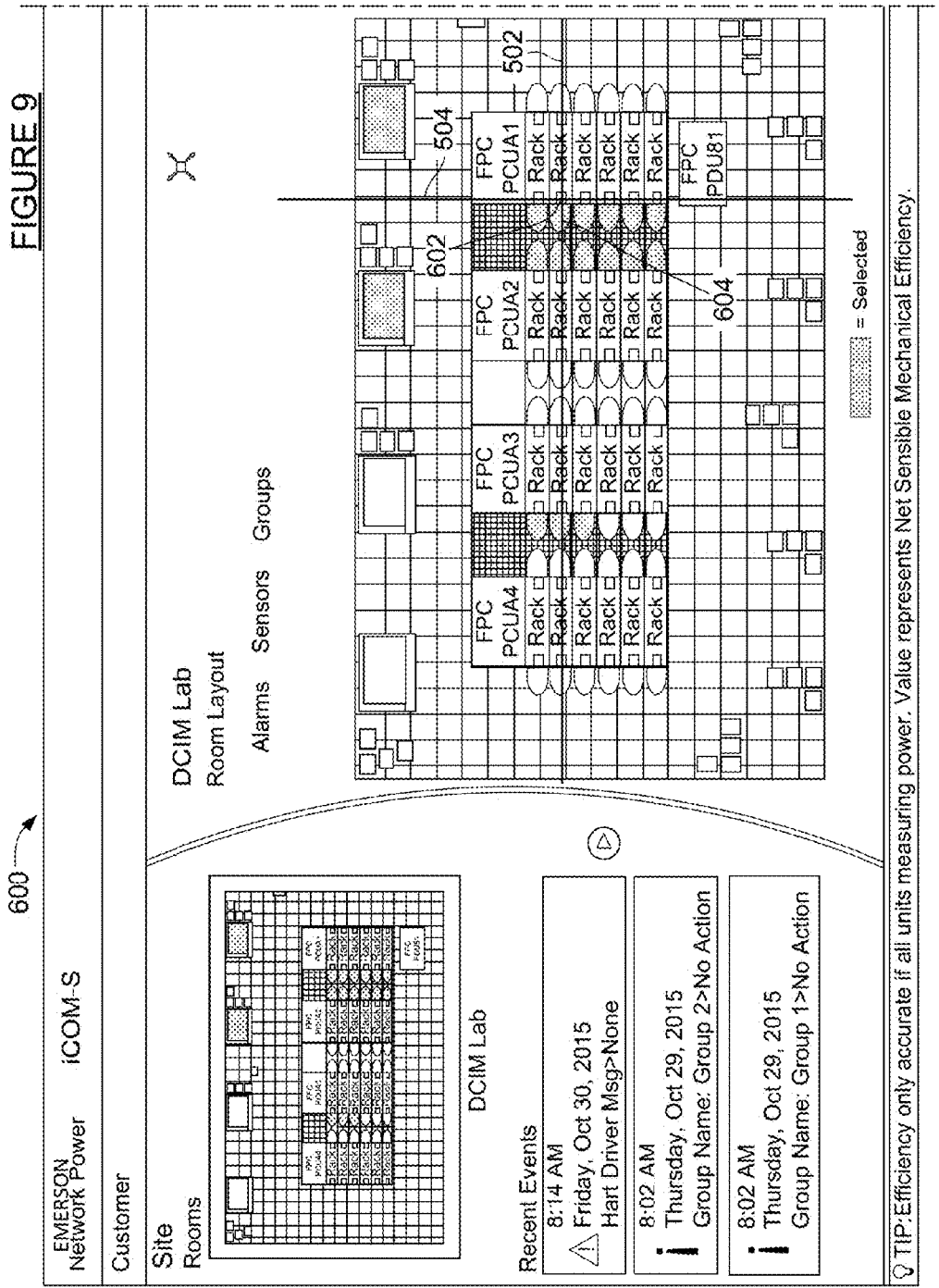

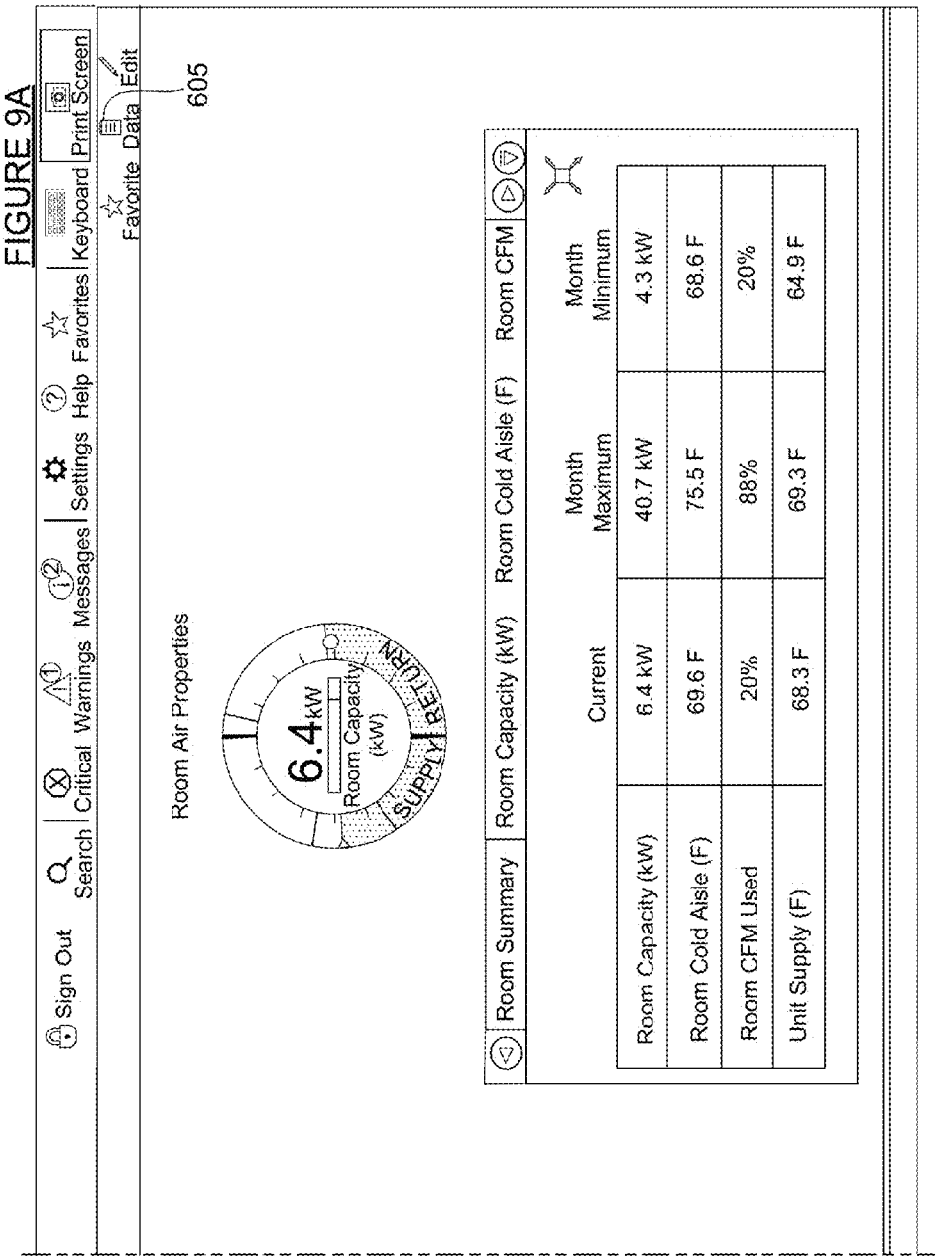

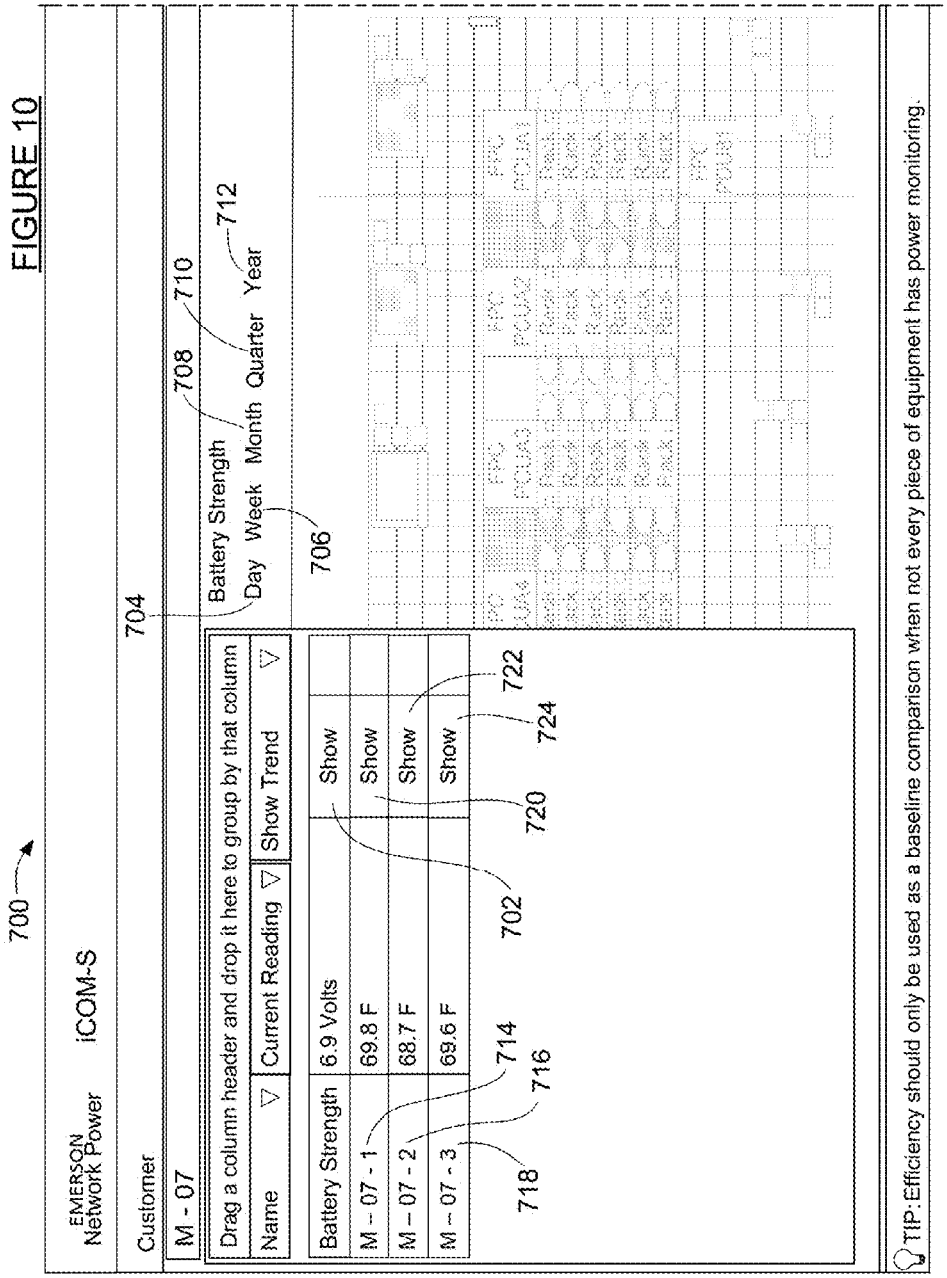

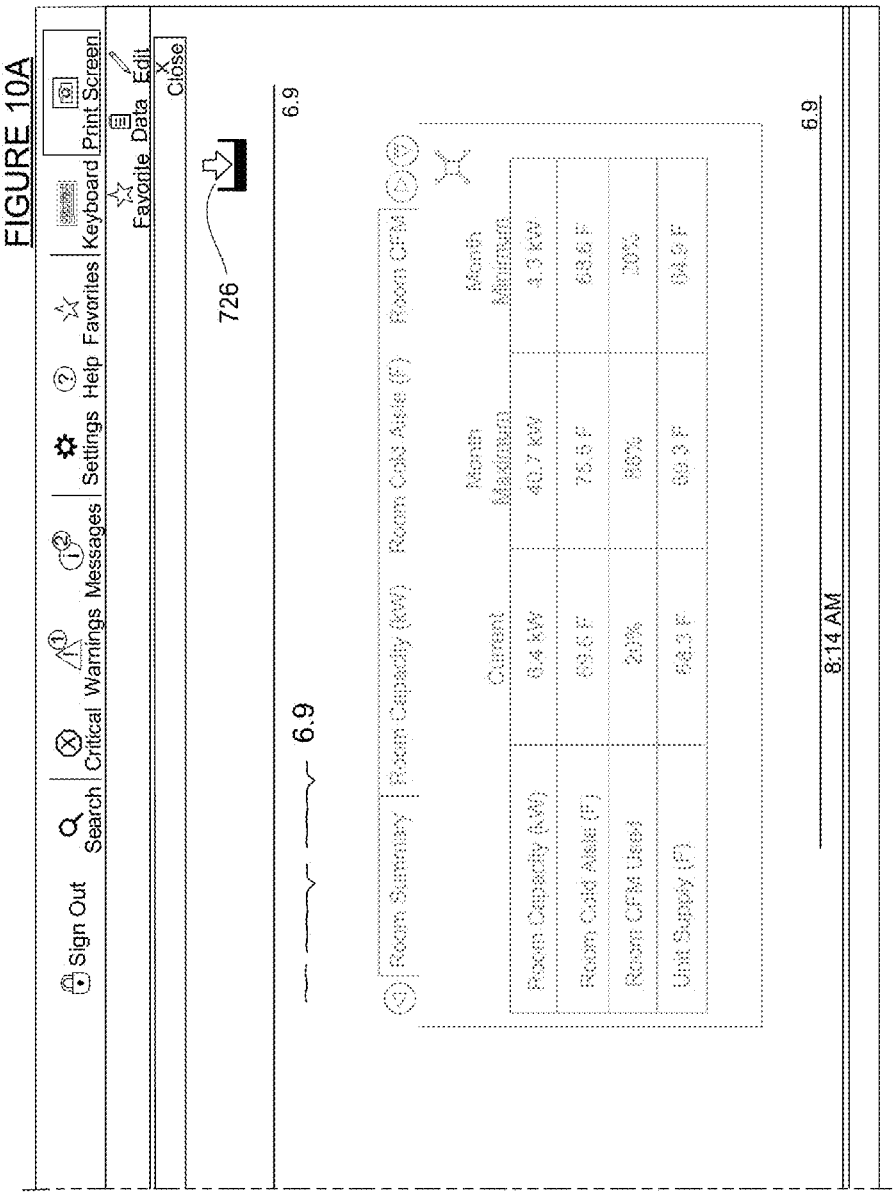

SYSTEM AND METHOD FOR RAPID INPUT AND CONFIGURATION OF SENSORS FOR A HVAC MONITORING SYSTEM

CROSS-REFERENCE TO RELATED APPLICATIONS

This application is a § 371 U.S. National Phase of PCT International Application No. PCT/US2015/066800, filed on Dec. 18, 2015. The entire disclosure of the above application is incorporated herein by reference.

FIELD

The present disclosure relates to systems and methods for monitoring and configuring HVAC components typically used in data centers, and more particularly to a system and method which enables a user to more easily assign specific sensors of an HVAC monitoring and control system to one or more distinct groups of sensors from a single configuration screen, and which further illustrates to the user at a glance which group of sensors each specific sensor is assigned to.

BACKGROUND

The statements in this section merely provide background information related to the present disclosure and may not constitute prior art.

A challenge with present day HVAC monitoring and control systems is configuring the large number of devices, and particularly sensors, that are often used to monitor performance and dictate control of the HVAC components. Such systems are often limited in their ability to present the sensors and other devices on a display screen in a manner that allows for quick decisions on modifying set points, changing unit groupings of sensors, changing sensor assignments, etc.

Providing a manner of inputting assignments for sensors and other components, where the system and method allows the user to quickly see at a glance how various sensors are assigned to distinct groups of sensors, as well as to assign sensors to one or more distinct groups, is important for enabling the sensors to be used to quickly gauge where cooling resources are being over-utilized with the data center or building, as well as where additional cooling resources are required. However, present day HVAC monitoring and control systems typically employ cumbersome systems for assigning sensors to specific groups. Present day HVAC control and monitoring systems are further limited in how sensors can be deployed, typically be limited to using any given sensor as part of only one single group of sensors for the purposes of determining important temperature information within various areas of a data center.

SUMMARY

In one aspect the present disclosure relates to a computer based system for analyzing temperature information being reported by a plurality of sensors present within a predetermined environment and controlling how various ones of the sensors are grouped together into a plurality of HVAC groups (teams) for monitoring and/or control purposes. The system may comprise a processor for communicating with the plurality of sensors via Gateway or HVAC medium to receive temperature data from each one of the plurality of sensors. A computer system may be included which has a touchscreen display. A software module having a user interface module configured to run on the computer system may also be included for analyzing the temperature data and generating an association matrix screen on the touchscreen display. The association matrix screen may include a plurality of fields for indicating a group assignment for each one of the plurality of sensors, and enabling a user to change a group assignment for any given one of the plurality of sensors by selection command to select one of the fields. The selection command operates to either associate or disassociate a particular one of the plurality of sensors with a specific group.

In another aspect the present disclosure relates to a computer based system for analyzing temperature information being reported by a plurality of sensors present within a predetermined environment and controlling how various ones of the sensors are grouped together into a plurality of groups for monitoring and/or purposes. The system may comprise a processor for communicating with the plurality of sensors to receive temperature data from each one of the plurality of sensors. A computer system is included which has a display screen. A software module is included which has a graphical user interface module configured to run on the computer system for analyzing the temperature data and generating an association matrix screen on the display screen. The association matrix screen may include a plurality of fields arranged in rows and column form, wherein each field indicates a group assignment for each one of the plurality of sensors, and enables a user to change a group assignment for any given one of the plurality of sensors by using a selection command on a selected one of the fields. The selection command operates to either associate or disassociate a selected one of the plurality of sensors with a specific group. The association matrix screen also provides a listing of all the sensors along with an identification code, adjacent to the plurality of fields, such that each specific group assignment for each sensor is indicated.

In still another aspect the present disclosure relates to a method for analyzing temperature information being reported by a plurality of sensors present within a predetermined environment and controlling how various ones of the sensors are grouped together into a plurality of groups for monitoring and/or control purposes. The method may also comprise using a processor to communicate with the plurality of sensors to receive temperature data from each one of the plurality of sensors. A computer system may be used which has a display screen to display information concerning the sensors. A software module may be used which has a graphical user interface module configured to run on the computer system. The software module may operate to analyze the temperature data received from the processor and to generate an association matrix screen on the display screen. The association matrix screen may include a plurality of fields for indicating a different group assignment for each one of the plurality of sensors and enabling a user to change a group assignment for any given one of the plurality of sensors by using a selection command on a selected one of the fields. The selection command operates to either associate or disassociate a give one of the sensors with a given one of the group assignments.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 2 is a graph that may be generated by the system which provides a high level depiction of a subquantity of a total number of sensors that are reporting a temperature below their specific predetermined lower limit, a subquantity of sensors that are reporting a temperature above their specific upper predetermined limit, and a subquantity of sensors that are reporting a temperature within their specific predetermined temperature range;

FIGS. 2a-2e illustrate other variations of the graph of FIG. 2 to illustrate other operating scenarios with the monitored environment;

FIG. 3 is an illustration of an association matrix screen that may be generated by a software subsystem of the present disclosure to enable a user to both assign or "associate" different sensors into one or more sensor groups, while displaying in a grid-like fashion the associations of all the sensors with their respective group(s), and further displaying a wide variety of other information relating to system performance, calculation results, and/or user selections;

FIG. 7 shows a screen generated by the system 10 for depicting the layout of all components being monitored by the system 10 within a selected room, along with information on the amount of cooling capacity (kW) being provided by the system connected HVAC units in the selected room;

FIG. 9 shows the room layout of FIG. 8 with the cross hairs positioned over a wireless radio associated with a specific equipment rack; and FIG. 10 shows the screen of information that the system 10 generates from the selection of the wireless radio in FIG. 9, wherein the screen provides information on a battery strength of a battery associated with the selected radio and makes available a wide selection of trend information for the battery strength, and wherein temperature information is also presented for those temperature sensors associated with the radio, and wherein trend information is also made available for each of the temperature sensors.

DETAILED DESCRIPTION

Figure 1:
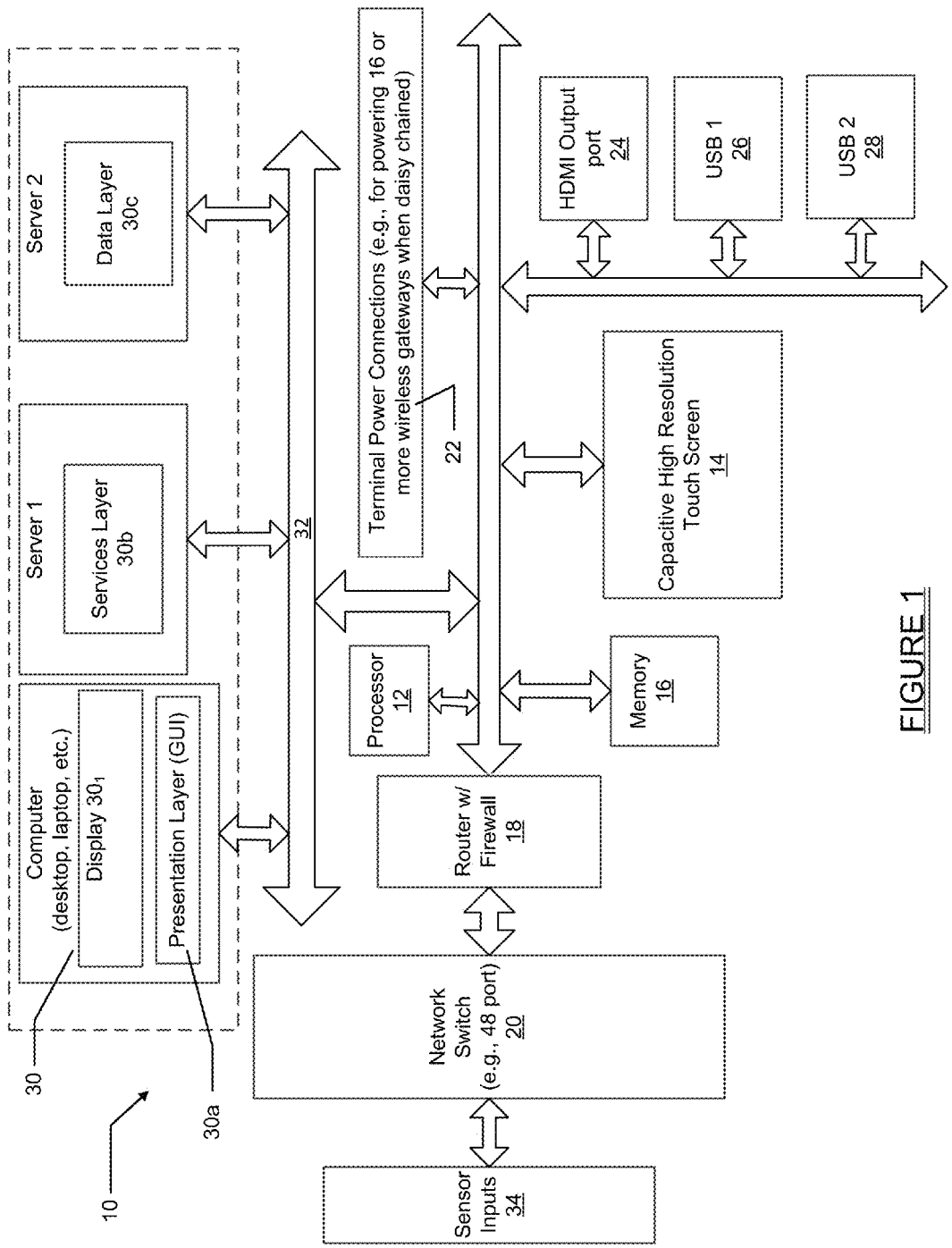
FIG. 1 is a high level block diagram of one embodiment of a system in accordance with the present disclosure.

The following description is merely exemplary in nature and is not intended to limit the present disclosure, application, or uses. It should be understood that throughout the drawings, corresponding reference numerals indicate like or corresponding parts and features.

Referring to FIG. 1, a system 10 in accordance with one embodiment of the present disclosure is shown. The system 10 in this example may include a processor 12 (e.g., microcomputer) such as a desktop, laptop, computing tablet, other form of personal electronic device such as a smartphone, or a commercial grade Server. The processor 12 communicates with a high resolution display system 14, such as a touchscreen display, a memory 16 (e.g., RAM, ROM or both), and a router 18 having a firewall. The memory 16 is shown as an independent component, but the memory 16 could be contained in the processor 12 enclosure instead. The router 18 communicates with a network switch 20.

The system 10 also provides terminal power connections 22 for powering a predetermined maximum (at least 16 in this example) quantity of wireless gateways when the wireless gateways are daisy chained together. The system 10 may also include at least one HDMI port 24, a first USB (USB 2.0 or 3.0 protocol) port 26 and preferably a second USB (USB 2.0 or 3.0 protocol) port 28. A remotely located computing device 30 may be in communication with the system 10. The computing device may be a desktop computer, a commercial grade server, a laptop computer, a computing tablet or possibly even a smartphone. Simply for convenience the computing device 30 will be referred to herein as "computer 30".

A software component of the system 10, made up of a plurality of software modules including a graphical user interface (GUI) presentation layer 30a or module, a services layer 30b or module, and a data layer 30c or module may be included for assisting in collecting, analyzing and presenting information in graphical form for display on a display system $30_1$ of the computer 30. It is a principal advantage of the system 10 that the sensor information reported by a large plurality of sensors being monitored by the system 10, and particularly temperature sensors, can be presented on the display system $30_1$ of the computer 30 in a manner in which a large amount of data can be easily understood by a user. In one implementation a presentation layer 30a (i.e., GUI) is loaded onto the computer 30, the service layer 30b is loaded onto a first server (Server 1) and the data layer 30c is loaded onto a second server (Server 2). The computer 30, Server 1 and Server 2 may communicate via a network 32 with one another, as well as with the system 10 to receive the sensor data collected by the processor 12. A dashed line has been used around components 30, 30a, 30b and 30c to indicate that in this embodiment they may be separate and remote from the other components of the system 10. Alternatively, the software modules 30a-30c may all be loaded onto the computer 30. Still further, the software modules 30b and 30c may be loaded onto a single server or multiple distributed servers installed locally or remotely. Still further, the presentation layer 30a, or possibly all the layers 30a, 30b and 30c may be presented on the touchscreen display system 14.

The "Sensor Inputs" box 34 in FIG. 1 is intended to represent all the data received from the various sensors and electronic sensing/measuring devices being used with the various equipment items in a given area such as a data center. In a large data center often hundreds or thousands of temperature sensors, air flow sensors, water sensors, etc. may be used to monitor the equipment and/or ambient environment within the data center, and it is these signals and/or data from these various components which is being input to the system 10, as represented by box 34. Typically the sensor signals 34 are input via a wireless gateway or via one or more HVAC units (i.e., via wired sensors), which are shown in simplified form by box 34*a*. The use of temperature sensors is of particular importance because of the critical need to maintain the ambient temperature within various rooms or areas of a data center within a predetermined range. Equipment racks that are fully populated with equipment components may be radiating more heat than other racks that are only partially populated with components, and the configuration of the data center itself may impose challenges in maintaining an acceptable ambient temperature throughout all the areas of the data center.

Referring to FIG. 2, the presentation module 30*a* may be used to provide a graph 40 on the display 30$_1$ of the computer 30 which enables the user to immediately gain a general (i.e., "high level") view of the overall temperature conditions within the environment being monitored. In this example the environment is a data center. More particularly, the graph 40 indicates how many temperature sensors within the environment are reporting a temperature within a predetermined acceptable temperature range, represented by a first graph component 42 shown as a box portion, and more particularly in this example a green box portion. For clarity, in this example and explanation it is assumed all sensors being graphically represented have the same allowable operating temperature range. The scope of this explanation should note that, in reality, it is likely that the sensors will have different allowable operating ranges. In this case, the values shown on the graph 40 represent the difference in the sensor value compared to either the low or high allowable sensor value on a per sensor basis and not a common allowable range for all sensors being graphically represented. The graph 40 also shows how many sensors are reporting a temperature below a lower limit of a predetermined temperature range, as represented by a second graph component 44 shown in this example as a blue box. The graph 40 further shows how many sensors are indicating a temperature above an upper limit of a predetermined temperature range associated with each sensor, as indicated by a third graph component 46, which in this example is shown as red box portion. A line 48*a* is used to indicate the sensor value being reported which represents the largest standard deviation for the group of sensors that are reporting values below the predetermined lower temperature limit (−12 in this example). The line 48*b* also indicates what the largest standard deviation is for the sensors that are reporting values above the upper predetermined temperature limit (+20 in this example). The number "4" adjacent box 44 indicates the number of sensors reporting a temperature value below the allowable lower temperature limit, and number "−4.03" represents the standard deviation number for the four sensors represented by box 44. Similarly, the number "10" represents the total number of sensors reporting a value which is above the upper predetermined temperature limit, and the number "5.75" represents the standard deviation number for the group of sensors reporting a temperature signal which is above the predetermined upper temperature limit. Accordingly, just a quick glance at the graph 40 provides the user with a "high level" view as to temperature conditions throughout the environment being monitored (e.g., data center in this example).

FIGS. 2*a*-2*e* show other variations of how the graph 40 might appear under different conditions. Graph 40*a* in FIG. 2*a* indicates via blue shading of box 40*a*1, the red shading of box 40*a*2 and the green shading of box 40*a*3, that most of the sensors are either below their lower limit (box 40*a*1) or above their upper limit (box 40*a*2), and that only a small number of sensors are within the upper and lower limits (box 40*a*3). Graph 40*b* of FIG. 2*b* indicates that a small number of sensors are below their lower limit (box 40*b*1), a majority of the sensors are within their limits (box 40*b*3) and a relatively large number are above their upper limit (box 40*b*2). Graph 40*c* of FIG. 2*c* indicates a small number of sensors are below their lower limit (box 40*c*1), a large majority are above their upper limit (box 40*c*2) and a very small number are within their limits (box 40*c*3). Graph 40*d* of FIG. 2*d* indicates a large number of sensors are below their lower limit (box 40*d*1), a moderate number are within their limits (box 40*d*3) and a very small number are above their upper limit (box 40*d*2). Graph 40*e* indicates only a very small number of sensors are below their lower limit (box 40*e*1), the great majority of sensors are within their limits (box 40*e*3) and only a very small number of sensors are above their upper limit (box 40*e*2).

Referring to FIG. 3, an association screen 50 is shown which enables a user to quickly see which sensors are associated with different HVAC groups/teams within an environment (e.g., data center) being monitored and/or controlled. It will be appreciated that the system 10 in this example is employed in a "mesh" network where a plurality of wireless radios transmit and communicate bi-directionally to their respective/pre-programmed parent gateways. In FIG. 3, the association matrix screen 50 presents a tab 52 for each one of the gateways that currently has at least one sensor communicating to it. In FIG. 3 tab 52*a* (Gateway 1) has been selected by the user either using a mouse to make a selection command, or if the display 30$_1$ is a touchscreen display, by simply touching on tab 52*a*. In either event, the tab 52*a* changes from an opaque presentation to a fully illuminated presentation. The gateways 52*b*, 52*c*, and 52*d* are opaque, indicating that they are available to be examined but are not currently selected. Clicking on any one of gateways 52*b*, 52*c* or 52*d* using a mouse selection command or a touchscreen command would bring up the selected gateway in place of gateway 52*a*.

The association matrix screen 50 may be displayed on the display 30$_1$ (or possibly on the touchscreen 14) and provides information at a glance that enables a user to "associate" any particular sensor with any one or more groups of sensors. The sensors are illustrated in column 54, with sensor 54*a* being the first listed sensor (ID: G1S1—Rack 13A—Temp 86.2 F). This information explains that the identification number for sensor 54*a* is "G1S1", that it is located on equipment rack "13A", and that it is currently reporting a temperature of "86.2 F". A colored line 54*a*1 may be used to provide an immediate visual illustration of a status of sensor 54*a* relative to a predetermined temperature range that the sensor is expected to operate in. Thus, the line 54*a*1 may be colored dark blue, for example, if sensor 54*a* is reporting a temperature indicating that it is below a predetermined lower temperature limit (e.g., 65 degrees F.), or it may be colored red if it is above a predetermined upper temperature limit (e.g., 85 degrees F.), or it may be colored any one of one or more intermediate colors to signify how close it is to its upper or lower limit. A neutral color such as gray may be used to indicate that the sensor is reporting a temperature approximately in the middle of its predetermined temperature range. A control selection 56, when selected by the user using a mouse or touchscreen command, sorts the sensors by temperature placing the sensors in descending order from hottest to coldest. Of course, this selection could be modified to instead list the sensors in order from coldest to hottest.

The association screen 50 further displays an information tab 58a, 58b, 58c, etc., for each group of sensors that have been previously defined. For example, "Group 1", identified by reference number 58a, provides information explaining that a calculation of the average of the 5 warmest temperature sensors is selected for purposes of control and that this value of the temperatures being reported from the sensors of Group 1 is 87.5 degrees F., that Group 1 includes a total of 184 sensors being associated to a group in which 8 HVAC units belong. A colored line, such as line $58b_1$, may define each information tab to represent whether the group of sensors is within a predetermined temperature range, or below the predetermined temperature range (e.g., blue line), or above the upper limit of the predetermined temperature range (e.g., red dashed line $58b_1$). Tab 58b provides information that the temperature values of the group represent a third calculation method based around standard deviation is selected. It should be noted the calculations described herein are for example purposes only and may vary in different implementations and executions of the invention. As such, the calculations described herein should not be interpreted as limiting the scope of the system 10 described herein.

The association screen 50 also provides a plurality of fields 60a-60e arranged in an X-Y grid of rows and columns to indicate which group (or groups) each sensor is presently associated with. By "associated with" it is meant which group or groups each sensor is designated as being grouped with. Thus, each sensor can be grouped with one, two, or more distinct groups of sensors. This is valuable for those sensors that may be located at a borderline or overlapping zones of influence in an environment, and thus where it would be helpful to include the sensor's readings in making calculations for two or more different groups of sensors. In this example sensor 54a (G1S1) is associated with groups 58a and 58c. The user is able to move a horizontal scrolling control (not shown) on the display screen $30_1$ to scroll horizontally and see all additional groups that sensor 54a is associated with. Any field associated with a group in which the sensors of the group are above an upper predetermined temperature limit may also be bordered with a colored or shaded line, such as indicated with fields 62b and 62d. This also provides an immediate visual indication to the user that that specific group has a mean temperature that is above or below the upper predetermined temperature limit. In this example sensor/group combinations 62b and 62d have temperatures that are both above their predetermined upper temperature limits for either the sensor or the group it belongs to.

The system 10 provides the user with the ability to simply click on any particular field 60, 62, if it is not already colored, which instantly associates that particular sensor aligned with the row that that selected field is located in. So for example, making a selection command by clicking on field 60b using a mouse or touchscreen display 14 would immediately associate sensor 54a with sensor group 58b1 (Group 2). Clicking on or touching a field that is already highlighted would dis-associate the sensor from that particular group. This makes it extremely easy and convenient for the user to change sensor group assignments, while still providing the user with a broad picture visual as to which group (or groups) of sensors that each one of the sensors is associated with.

Figure 4:
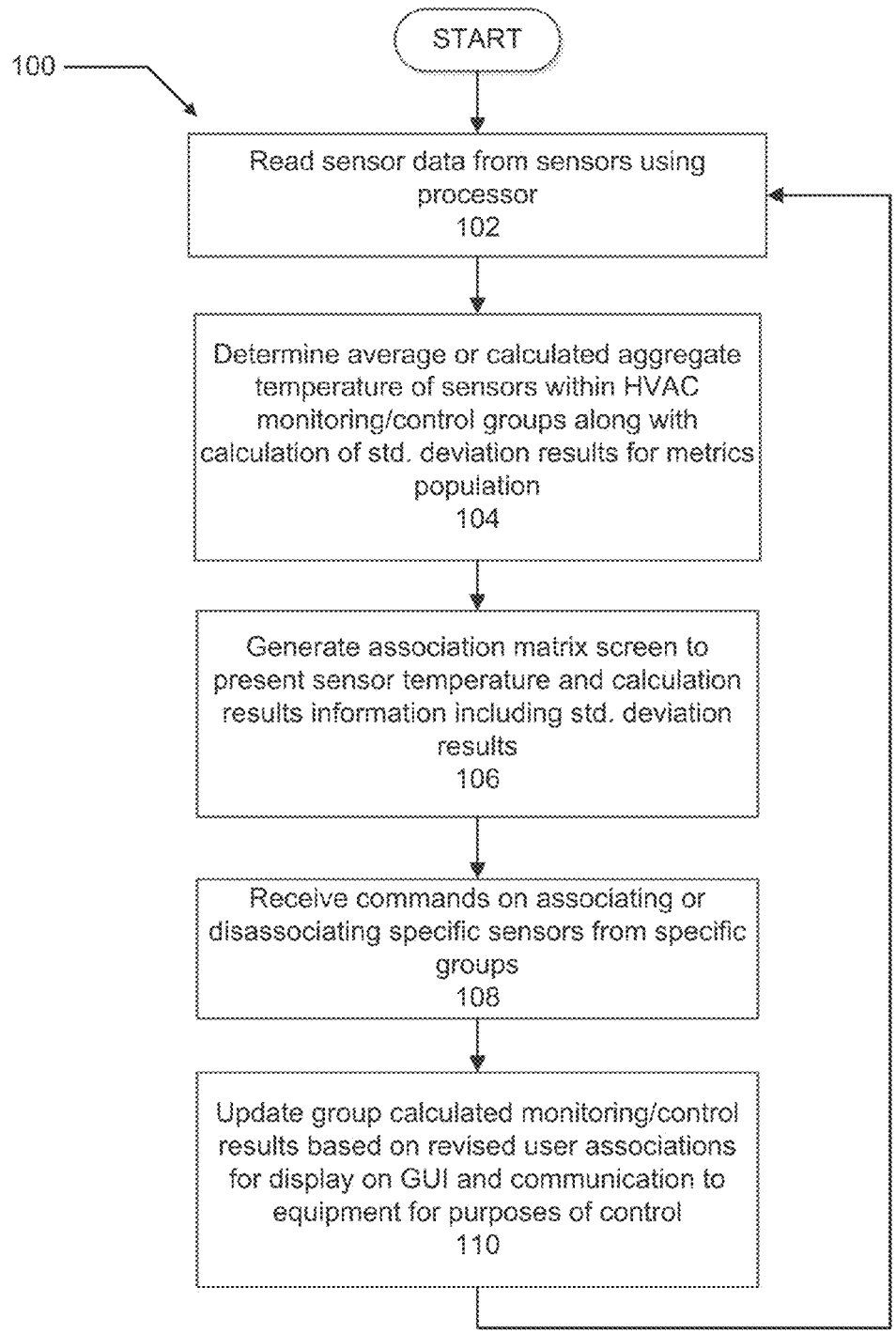
FIG. 4 is a flowchart illustrating basic operations performed by the system in obtaining the sensor data, using the data to generate the association matrix screen and making any updates to the association matrix screen based on commands received from the user.

Referring to FIG. 4 a flowchart 100 is shown setting forth basic operations that the system 10 may perform in generating and updating the association matrix screen 50. The system 10 initially reads and collects sensor data from all of the sensors being monitored and controlled using the processor 12, as indicated at operation 102. At operation 104 an average or calculated aggregate temperature of the sensors within each separate group of sensors is determined, along with standard deviation information associated with the sensors for each group. At operation 106 the software subsystem 30 of the system 10 generates the association matrix screen 50 to present the sensor temperature and standard deviation information on the display screen 14. At operation 108 the software subsystem 30 receives commands from the user via a mouse or touchscreen selection command associating or disassociating specific sensors from specific groups. At operation 110 the software module 30 updates the groups and/or creates new groups pursuant to the commands received from the user, and displays on display screen $30_1$ updated information on the sensors associated with each group along with any updated temperature or standard deviation information which resulted from changes in the sensor composition of any one or more of the groups. The operations 102-110 may then be repeated.

Figure 5:
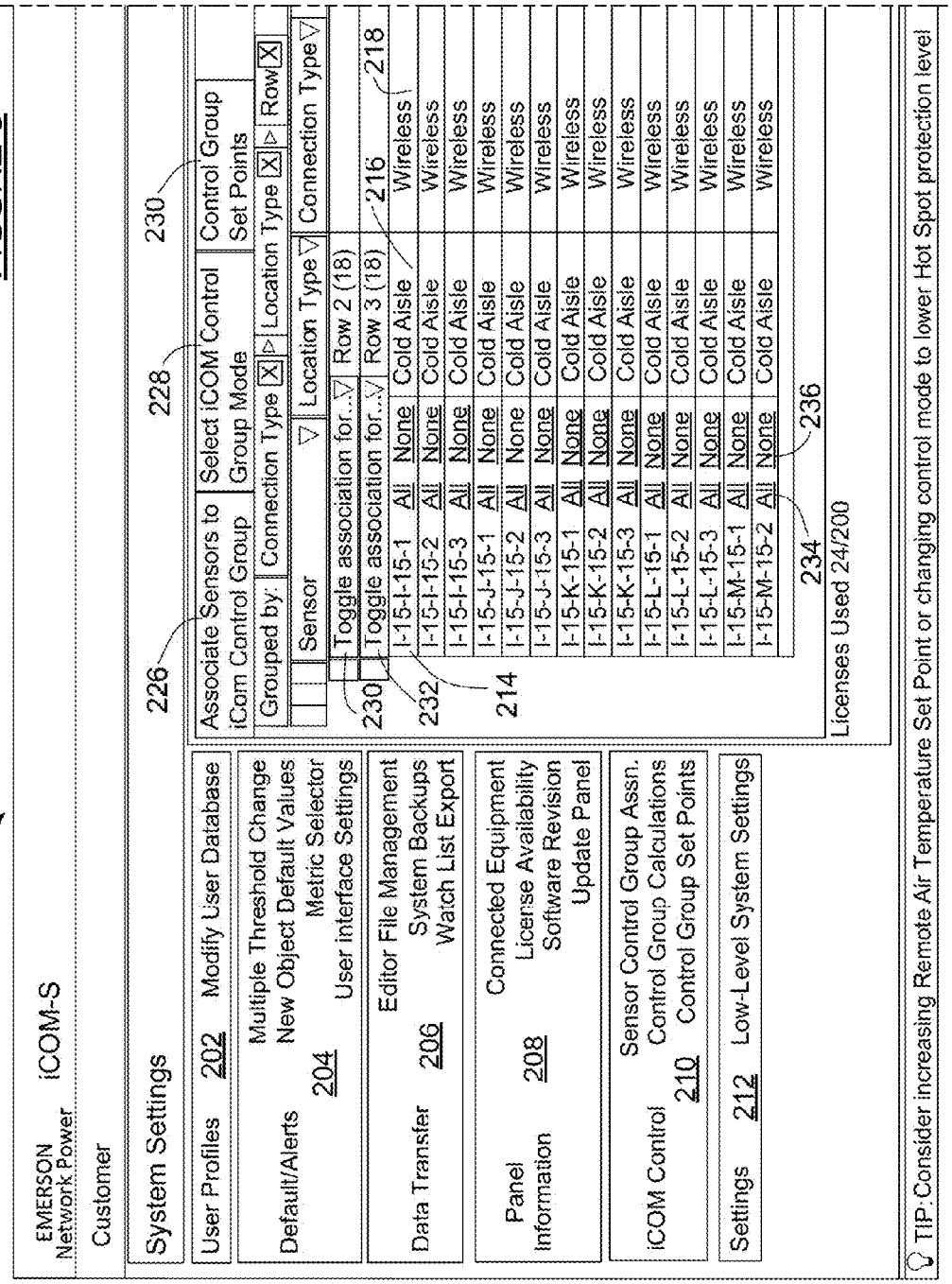
FIG. 5 shows another embodiment of a screen generated by the system for associating each sensor being used with one or more sensor groups, and presenting a grid of information that graphically illustrates the association(s) of every sensor with regards to user sorted sensor classification.

Referring to FIG. 5, screen 200 shows another manner in which the software subsystem 30 of the system 10 may display important information and control options to the user on display screen $30_1$. Screen 200 would thus be used in place of screen 50. Screen 200 presents control selections for "User Profiles" 202, "Defaults/Alerts" 204, "Data Transfer" 206, "Panel Information" 208, "iCOM Control" 210 and "Settings" 212. In FIG. 5, the "iCOM control" selection 210 has been selected which presents a column 214 for listing the identification code (name) for each sensor, a column 216 to show a "Location Type" for each sensor, a column 218 to indicate a connection type of each sensor, a column 220 to indicate which row of equipment racks the sensor is associated with, and columns $220_1$ and $220_2$ to indicate which group(s) each sensor is associated with. Clicking with a mouse (or using a touchscreen command) on any field within column $220_1$ will implement a selection to associate the sensor in that row with the Group 1 sensors. A specific sensor may be associated with any number of different sensor Groups $220_1$-$220_n$. Selecting the "Save Changes" control 222 saves the currently selected sensor group associations. The "Cancel" selection 224 allows the user to cancel any changes that were just made. A principal advantage of screen 200 is that the user is able to see quickly at a glance all, or a substantial portion, of the various groups that a particular sensor is associated with, and can quickly change the association of any given sensor simply by mouse clicking (or touching) on the appropriate field. The information shown in FIG. 5 is presented to the user when tab "Associate Sensors to iCOM Control Groups" 226 is selected from screen 200. Tab "Select iCOM Control Group Mode" 228 enables the user to see the sensors and HVAC units that have been assigned to each other on a Group by Group basis while allowing a control calculation to be selected for that specific group. A user can also disable control on individual groups of HVAC units here. Tab "Control Group Set Points" enables temperature set points (e.g., Supply Air and Remote Air) to be set for individual HVAC units or entire group of HVAC units. Toggle option 230 and 232 ("None") can also be used to select or deselect multiple sensors at once based on a customer defined grouping scheme. Selection 234 ("All") and selection 236

("None") allow specific sensors to be associated with all of the user defined sensor groups or removed from all of the sensor groups.

Figure 6:
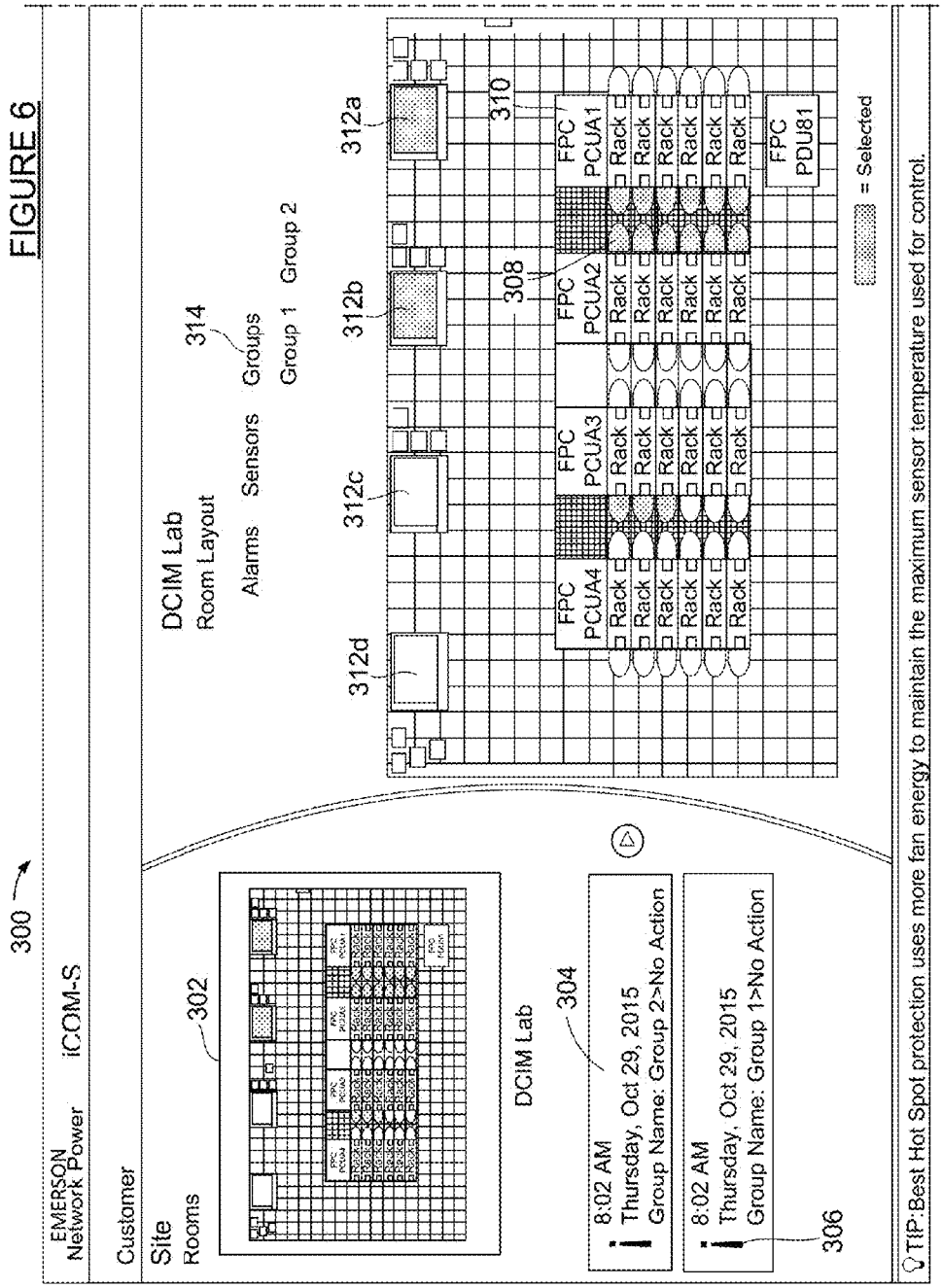
FIG. 6 shows a screen generated by the system which depicts the layout of all components being managed by the system within a specific, selected room of a data center, as well as graphically indicating those sensors which are associated with a specific selected sensor group, and further indicating detailed information concerning the selected sensor group in a separate pane of the screen.
Figure 6A:
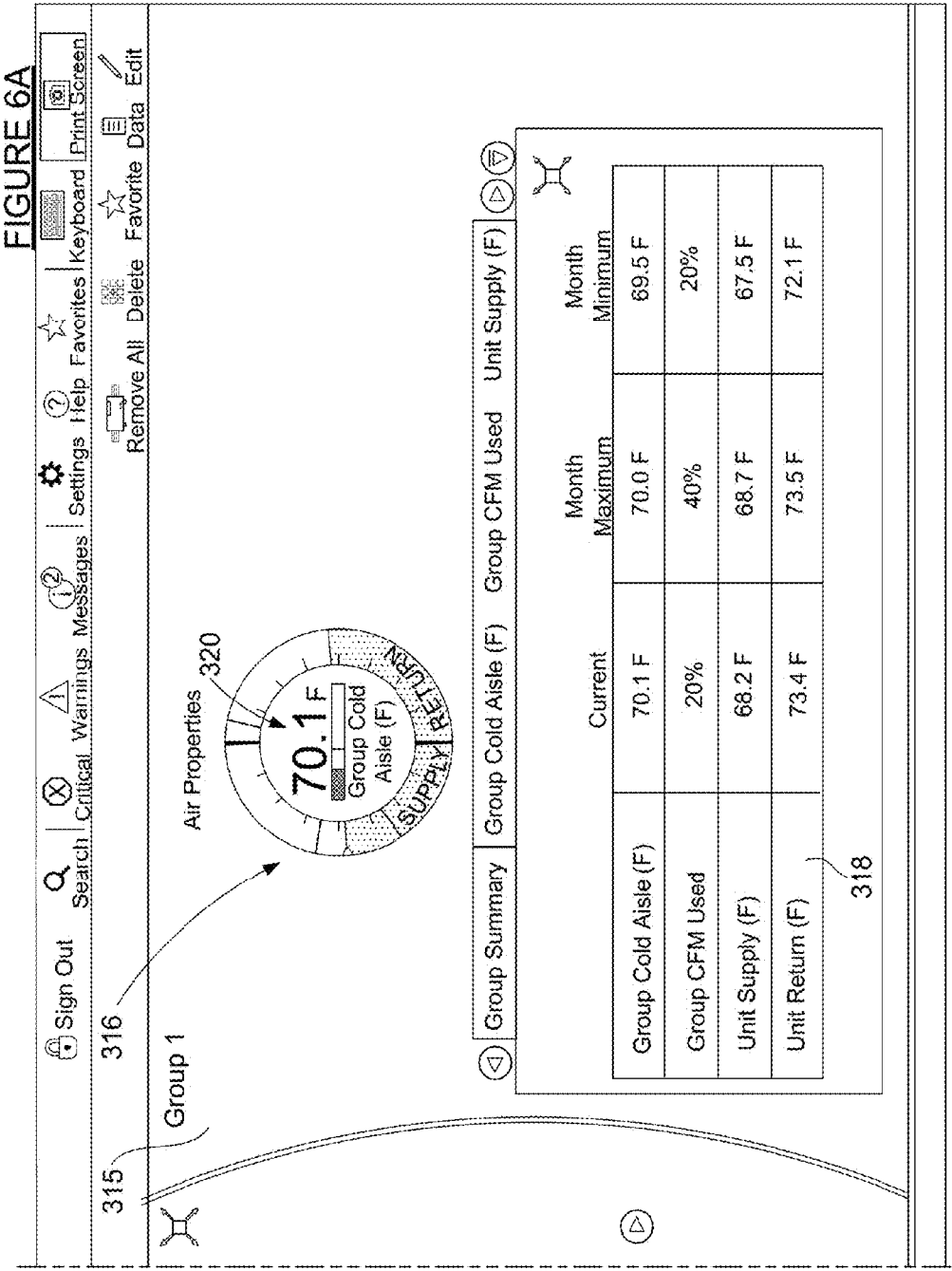

Referring to FIG. 6 a screen 300 that the system 10 produces is shown which allows the user to quickly see at a glance which temperature sensors of a selected group of sensors are associated with the various HVAC units in the environment. This enables the user to quickly and visually validate sensor association decisions made on controlling HVAC units in the space. Screen 300 is presented when the user initially selects a thumbnail 302 displayed along the left edge of the screen 300. In this example only one (Room) thumbnail 302 is shown, but in practice a data center (Site) may have a plurality of rooms, and each room will have an associated thumbnail shown along the left edge of the screen 300. Notifications 304 and 306 are Site Wide events and alerts to the user are preferably colored by severity.

The screen 300 of FIG. 6 shows highlighted or colored (e.g., with the color blue) indicators 308 which represent the temperature sensors which are associated with a specific group. The indicators 308 are disposed adjacent specific ones of the equipment racks, which are each designated with the name "Rack". The racks are also illustrated along with their respective PDUs 310. Cooling units 312 present in the room are also displayed, and those cooling units that influence the selected group of sensors may be highlighted, such as with the color blue, as indicated by cooling units 312a and 312b. In FIG. 6 cooling units 312c and 312d are not associated with the Group 1 sensors, so they are not highlighted. All the different sensor groups are listed under a "Groups" tab 314 when the Groups tab 314 is selected. Clicking (or touching) on the specific group brings up the layout illustration for that selected sensor Group. In FIG. 6 the "Group 1" sensor group has been selected for display.

FIG. 6 also shows a "Air Properties" graphic 316 along with a table 318 of cooling information related to the Group 1 sensors and cooling units. This information is presented in a separate pane 315 of the screen 300. The "Air Properties" graphic 316 indicates the current temperature 320. The left or "SUPPLY" designation of the Air Properties graphic 316 conveys the weighted average supply air temperature from the HVAC units in the currently selected Group (Group 1), while the right or "RETURN" side of the graphic represents the weighted average return air temperature from the HVAC units in the currently selected Group (Group 1). The triangles on both the left and right side of the dial represent the Supply and Return Air Set Points respectively of the units in that Group. If control is enabled on that Group the "Return" text changes to "Remote" and the blue arc represents the calculated control value being communicated to all of the units in that group. The blue triangle then represents the desired set point the user is trying to maintain typically representative of the cold aisle rack inlet temperature. If either the left or right side arcs extend outside of the recommended range the arc color changes, for example to red, to signify an undesired operating condition is occurring. Table 318 gives a summary of current, maximum for the current month, and minimum for the current month, for each of the Group Cold Aisle temperature, the Group CFM used (CFM used by the cooling units associated with the selected Group), the Unit Supply temperature and the Unit Return temperature. It should be stated these metrics are user selected and the implementation of the system 10 is not limited to only the metrics discussed in this example.

It will also be appreciated that the graph 40 shown in FIG. 2 could be presented as a circular graphic such as the Air Properties graphic 316. But instead of indicating temperatures of supply and return air flow, the circular graphic could be used much like a pie-chart or graph to indicate relative numbers of the sensors that are reporting temperatures above a predetermined upper temperature limit, below a predetermined lower temperature limit, or within a predetermined temperature range. Conversely, the circular Air Properties graphic 216 could be presented in some other graphical form such as a bar graph.

Screen 400 of the system 10 is shown in FIG. 7. Screen 400 is similar to screen 300 but illustrates all of the sensors present and in use in the selected Room. Screen 400 is displayed when the "Sensors" tab 400a is selected by the user. In this example the sensors present in the room include sensors 402 associated with the equipment cooling units, sensors 404 associated with the cooling units and sensors 406 located remotely in the room. The sensor color is dictated by their current value being read to allow the user to quickly see where the warm and cold spots exist in the environment. The "Room Air Properties" graphic 408 in this example provides information on the current cooling capacity being supplied by all of the HVAC units in the currently selected room. A "Room Summary" table 410 provides important information at a glance showing the current, maximum for the month and minimum for the month for each of Room Capacity (in kW), "Room Cold Aisle (F)", "Room CFM Used" and "Unit Supply (F)". Selecting the "Alarms" tab 400b from screen 400 would display (such as by highlighting or a specific color) those sensors or pieces of equipment which have triggered an alarm or alert. Again, it should be noted the metrics discussed above are user selected and provided merely as examples of different types of metrics that the user may select. As such, it will be appreciated that the system 10 is not limited to use with only these metrics, and in actual practice it is anticipated that users will likely customize the system 10 through the use of different types of metrics.

Figure 8:
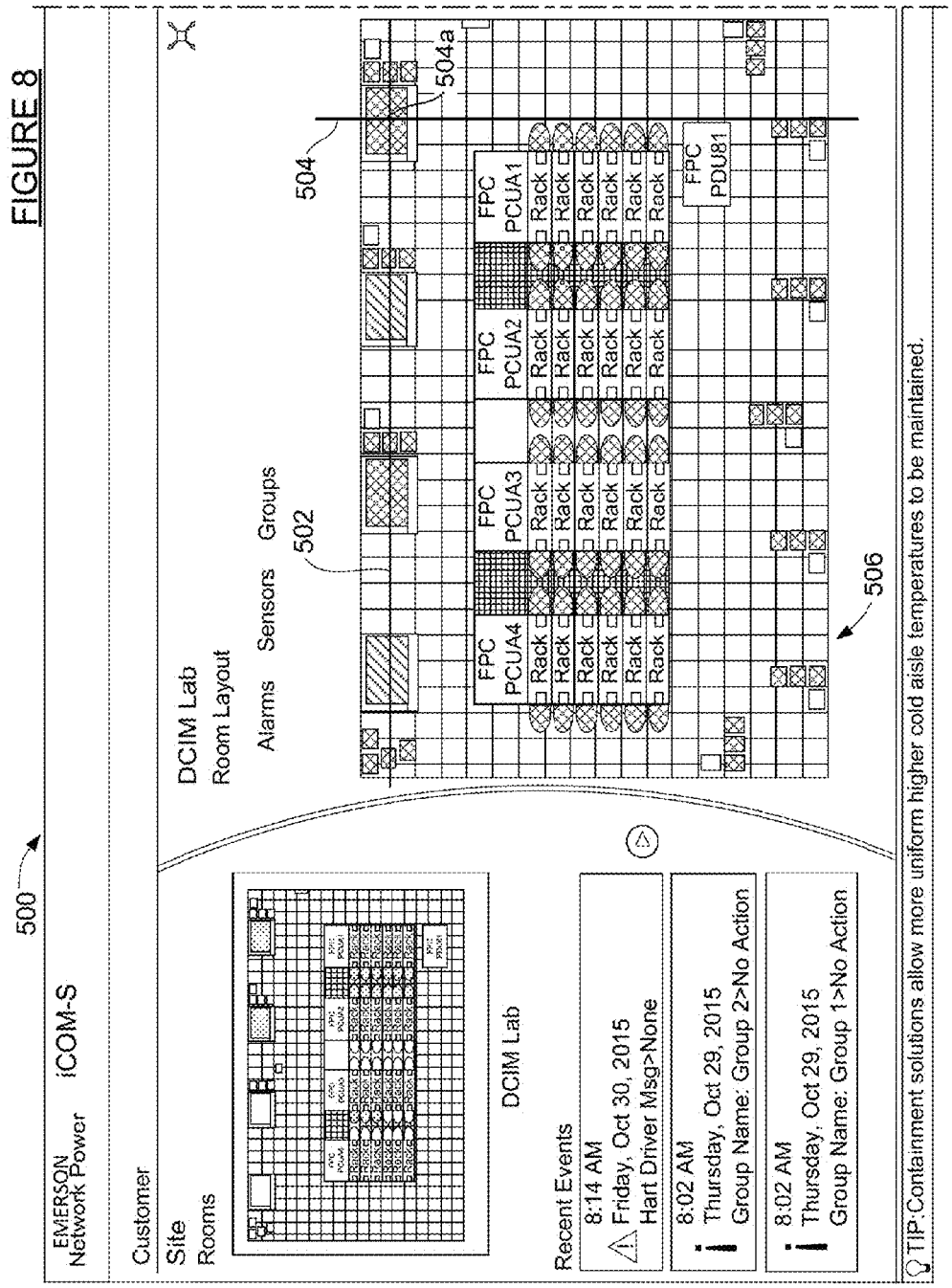
FIG. 8 shows a pair of cross hairs that may be used with the room layout display of FIG. 7 to precisely indicate any given component in the selected room, and wherein a separate display pane is generated that shows detailed information on the selected component if applicable.

Referring to FIG. 8, screen 500 illustrates another feature of the system 10 which involves the use of vertical and horizontal cross hairs 502 and 504, respectively, which are positioned over a component which has been selected by the user in the "Room Layout" display or selected by the user on a different screen from within the presentation layer 30a (i.e., GUI; e.g., a Search screen within the GUI). In this example the cross hairs 502 and 504 are positioned over a cooling unit 504a which has been selected by the user. This causes the system 10 to generate information within a pane 508 that is specifically directed to performance of the selected component (i.e., cooling unit 504a, designated with the name "CW1"). An "Air Properties" graphic 510 is generated in the pane 510 which shows the current cooling capacity (kW) of the cooling unit 504a. A table 512 also generated in the pane 510 shows current, month maximum and month minimum for the "Unit Capacity (kW)", the "Unit CFM" and the "Unit Capacity Used". When searching for a specific selected component using the system 10 from a search screen (not shown), the selected component will be indicated in a display screen, such as screen 500, using the cross hairs 502/504 so the user is provided with an immediate visual indication exactly where in a given room the component is physically located.

Referring to FIG. 9, screen 600 shows the crosshairs 502/504 positioned over a square shaped graphic representing a specific battery powered wireless radio 602 associated with sensors 604, which are collectively located near a specific rack. Clicking the mouse button (e.g., left button) on a mouse being used with computer 30, or on a touchscreen display used with computer 30 on top of the "Data" icon 605 in the upper right context sensitive menu of screen 600, generates screen 700 of FIG. 10. Screen 700 in FIG. 10 shows the current battery strength for the battery associated with the specific wireless radio 602 (designated by name "M-07" in this example) being used with the system 10, along with information on each of the three sensors ("M-07-1", "M-07-2" and "M-07-3") that are associated with the selected radio. A "Show" button selection 702 on the screen 700 of FIG. 10, when selected, generates trend information for the battery strength in a window pane 704. The trend information can be presented according to "Day", "Week", "Month", Quarter" or "Year" by selecting any one of tabs 705, 706, 708, 710 or 712, respectively. Trend information can also be selected for each of the three sensors associated with the radio 602, herein labelled sensors 714, 716 and 718 by clicking any one of the "Show" selections 720, 722 and 724, respectively. Clicking on a "Data Export" icon 726 will also prompt the user for a file save location in which case all the data used to generate the trend will be exported to a common file format. Accordingly, the system 10 enables a wide range of historical information to be presented in a highly intuitive manner, and also in a visually easily understood manner.

The system 10 and method of the present disclosure provides a means to collect, analyze and present a large amount of useful data in a highly organized and efficient manner. This makes it easy for the user to instantly assess which areas of a data center or other environment may be too hot, too cold or within predetermined temperature limits. The system 10 also provides a means for the user to quickly and easily associate or disassociate specific sensors with one or more groups of sensors through simple command selections from a mouse or touchscreen and to see, from a mathematical standpoint, how the association of one or more sensors affects the mean, standard deviation, or other aggregated data calculated for a given group of sensors. The system 10 also enables all sensors associated with a specific gateway to be shown, along with color or shading which indicates at a glance which sensors are above or below a predetermined temperature limit, and which sensors are within a predetermined temperature range.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A computer based system for controlling use of a plurality of sensors present within a predetermined environment and controlling how various ones of the sensors are grouped together into a plurality of groups for monitoring/control purposes, the system comprising:
   a processor for communicating with the plurality of sensors and using data reported from the sensors to generate a metric therefrom, the processor further configured to receive temperature data from designated groups of the plurality of sensors, the processor communicating with a computer system having a display system;
   a user interface system module adapted to run on a computer, the user interface system module being in communication with the processor and configured to generate a graphical user interface on the display system;
   at least one of a touchscreen display or a mouse in communication with the computer based system for enabling the user to interact with and make selections using the user interface system module;
   the graphical user interface being controlled by the computer based system and configured to generate an association matrix screen on the display system, the association matrix screen including a plurality of fields arranged in a matrix array for indicating a group assignment for each one of the plurality of sensors, and enabling a user to change a group assignment for any given one of the plurality of sensors by making a selection of a specific one of the fields, the selection operating to either associate or disassociate a selected one of the plurality of sensors with a specific group, and wherein at least one of the plurality of sensors is able to be associated, using the associate matrix screen, with two or more different, selected groups of sensors, and all the groups of sensors with which a given said sensor is associated with are displayed on the association matrix screen along with a separate information tab associated with each said group of sensors, each said information tab providing information on a performance of at least a subplurality of the sensors associated with a given said group of sensors.

2. The system of claim 1, wherein the association matrix screen further is configured to display identification information associated with each one of the plurality of sensors.

3. The system of claim 2, wherein the association matrix screen displays the sensors in a list format.

4. The system of claim 1, wherein the association matrix screen includes a selection control for enabling a user to sort or group the sensors in a list format according to a predetermined criterion.

5. The system of claim 4, wherein the predetermined criterion is from highest to lowest according to a temperature being reported by each one of the sensors.

6. The system of claim 1, wherein the association matrix screen includes information for each one of the displayed groups relating to a mean or other calculated temperature of all of the sensors assigned to each said group.

7. The system of claim 6, wherein each said information tab includes a marking indicating if a mean or other calculated value of sensor temperatures represented by its associated said group is above a predetermined upper temperature limit.

8. The system of claim 1, wherein at least one of:
   the association matrix screen lists each one of a plurality of wireless gateways that the sensors are associated with; or
   the association matrix screen provides identification information including an identification number or name for a presently selected one of the gateways, the identification information being provided within the information tab.

9. The system of claim 1, wherein a specific one of the information tabs is provided with a graphic indicating a high temperature when an average temperature or calculated aggregated temperature of all of the sensors of a specific group of sensors associated with the specific information tab is above a predetermined allowable temperature value for the sensors.

10. The system of claim 1, wherein a specific one of the fields is provided with a graphic indicating that a sensor associated with the group is outside a predetermined temperature range.

11. A computer based system for controlling use of a plurality of sensors present within a predetermined environment and controlling how various ones of the sensors are grouped together into a plurality of groups for monitoring/control purposes, the system comprising:
- a processor for communicating with the plurality of sensors and using data reported from the sensors to generate a metric therefrom, the processor further configured to receive temperature data from the plurality of sensors, the processor communicating with a computer having a display system;
- a user interface system module adapted to run on the computer, the user interface system module being in communication with the processor and configured to generate a graphical user interface on the display system;
- at least one of a touchscreen display system or a mouse, in communication with the computer based system, for enabling the user to interface with the user interface system module;
- the graphical user interface being controlled by the computer based system and configured to generate an association matrix screen on the display system, the association matrix screen including a plurality of fields arranged in an X-Y matrix array for indicating a group assignment for each one of the plurality of sensors, and enabling a user to change a group assignment for any given one of the plurality of sensors;
- the graphical user interface responsive to at least one of a touchscreen or mouse input signal to enable a user to make a selection of a specific one of the fields, and wherein the selection operates to either associate or disassociate a selected one of the plurality of sensors with a specific group, and wherein two or more ones one of the plurality of sensors are able to be associated with two or more different groups of sensors;
- a plurality of information tabs disposed adjacent the X-Y matrix for identifying each said group of sensors; and
- wherein all of the groups with which a given said sensor is associated with are displayed on the associated matrix screen along with a separate information tab associated with each said group of sensors, each said information tab providing information on a performance of at least a subplurality of the sensors associated with a given said group of sensors.

12. The system of claim 11, wherein the information tabs each include temperature related information for its associated said group of sensors.

13. The system of claim 11, wherein the association matrix screen includes a control for sorting all of the sensors in a list format.

14. The system of claim 13, wherein the list format is arranged according to a temperature being reported by each one of the sensors.

15. The system of claim 11, wherein the information tabs include graphic indicia to indicate when a mean temperature of the sensors of its associated group are at least one of above a predetermined upper temperature limit or below a predetermined lower temperature limit.

16. A method for controlling use of a plurality of sensors present within a predetermined environment and controlling how various ones of the sensors are grouped together into a plurality of groups for monitoring and/or control purposes, the method comprising:
- using a processor to communicate with the plurality of sensors and using data reported from the sensors to generate a metric therefrom, the processor further receiving temperature data from designated groups of the plurality of sensors, the processor communicating with a computer having a display system;
- using a user interface system module adapted to run on the computer, the user interface system module being in communication with the processor and configured to generate a graphical user interface on the display system; and
- the graphical user interface being controlled by the computer and configured to generate an association matrix screen on the display system, the association matrix screen including a plurality of fields arranged in a matrix array for indicating a group assignment for each one of the plurality of sensors, and
- using at least one of a touchscreen input or a mouse to enable the user to input a group assignment for any given one of the plurality of sensors by making a selection of a specific one of the fields, and the selection operates to either associate or disassociate a selected one of the plurality of sensors with a specific group, and wherein any one of the plurality of sensors is able to be associated with more than one different group of the sensors using at least one of the touchscreen input or the mouse; and
- wherein all of the groups with which a given said sensor is associated with are displayed on the associated matrix screen along with a separate information tab associated with each said group, each said information tab providing information on a performance of at least a subplurality of the sensors associated with a given said group of sensors.

17. The method of claim 16, wherein each one of said information tabs is displayed adjacent the matrix array for identifying each said group of sensors with an identification marking, and wherein said sensors include a plurality of temperature sensors, and wherein the information tab further displays an average temperature of at least a subplurality of the temperature sensors.

18. The method of claim 16, further providing each said field with graphic indicia to indicate when its associated said sensor is outside of a predetermined temperature range.

* * * * *